US008650267B2

(12) United States Patent
Luciani, Jr. et al.

(10) Patent No.: US 8,650,267 B2
(45) Date of Patent: *Feb. 11, 2014

(54) METHOD AND SYSTEM FOR SWITCHING BETWEEN REMOTE CONSOLE SESSIONS

(75) Inventors: Luis E. Luciani, Jr., Tomball, TX (US); Don Dykes, Houston, TX (US); Curtis R. Jones, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3111 days.

This patent is subject to a terminal disclaimer.

(21) Appl. No.: 10/728,465

(22) Filed: Dec. 5, 2003

(65) Prior Publication Data

US 2005/0125506 A1    Jun. 9, 2005

(51) Int. Cl.
*G06F 15/16*    (2006.01)

(52) U.S. Cl.
USPC ............................ 709/220; 709/227; 709/229

(58) Field of Classification Search
USPC .......... 709/220, 227, 229, 224, 228; 370/353; 714/31; 713/200
See application file for complete search history.

(56) References Cited

U.S. PATENT DOCUMENTS

| | | | |
|---|---|---|---|
| 5,444,849 A | | 8/1995 | Farrand et al. |
| 6,070,253 A * | | 5/2000 | Tavallaei et al. ................ 714/31 |
| 6,625,649 B1 * | | 9/2003 | D'Souza et al. ............. 709/225 |
| 6,633,905 B1 * | | 10/2003 | Anderson et al. ............. 709/219 |
| 6,904,458 B1 | | 6/2005 | Bishop et al. |
| 6,967,947 B1 * | | 11/2005 | Chen et al. ..................... 370/353 |
| 6,973,587 B1 | | 12/2005 | Maity et al. |
| 7,085,385 B2 | | 8/2006 | Frantz et al. |
| 7,174,189 B1 * | | 2/2007 | Chen et al. ................. 455/554.1 |
| 7,287,107 B2 | | 10/2007 | Noonan et al. |
| 2002/0138431 A1 * | | 9/2002 | Antonin et al. .................. 705/42 |
| 2003/0084169 A1 * | | 5/2003 | Zhu et al. ....................... 709/229 |
| 2003/0084337 A1 * | | 5/2003 | Simionescu et al. .......... 713/200 |
| 2003/0140121 A1 * | | 7/2003 | Adams .......................... 709/219 |
| 2003/0226015 A1 | | 12/2003 | Neufeld et al. |
| 2004/0221009 A1 | | 11/2004 | Cook et al. |
| 2005/0097182 A1 | | 5/2005 | Bishop et al. |

OTHER PUBLICATIONS

"Integrated Lights-Out Technology: Enhancing the Manageability of ProLiant Servers," Compaq Computer Corporation, Apr. 2002 (pp. 1-12).

Luciani et al., Office Action dated Oct. 29, 2007, U.S. Appl. No. 10/729,676, filed Dec. 5, 2003.

Luciani et al., Final Office Action dated Mar. 19, 2008, U.S. Appl. No. 10/729,676, filed Dec. 5, 2003.

Luciani et al., Office Action dated Jan. 26, 2009, U.S. Appl. No. 10/729,676, filed Dec. 5, 2003.

* cited by examiner

*Primary Examiner* — Khanh Dinh

(57) ABSTRACT

Logging into a remote computer by way of a management processor to initiate a remote console session and switching between a default remote console session and a non-default remote console session.

18 Claims, 3 Drawing Sheets

METHOD AND SYSTEM FOR SWITCHING BETWEEN REMOTE CONSOLE SESSIONS

CROSS-REFERENCE TO RELATED APPLICATIONS

This application is related to application Ser. No. 10/729,676 titled, "System For Establishing Hardware-Based Remote Console Sessions And Software-Based Remote Console Sessions" filed Dec. 5, 2003.

BACKGROUND

A server may be a computer that provides a service for other computers connected to the server via a network. One example of a server comprises a file server, which has a local disk and services requests from remote clients to read and write files on that disk. A client may be a computer or program that can download files for manipulation, run applications, or request application-based services from a server.

A client may also be configured to take control of a server from a remote location via a remote console which may provide the client with partial or full control of the server. Once a remote console is initiated, any subsequent input delivered by the end-user to the client (e.g., keyboard entries, mouse clicks) may be delivered to the server. Similarly, output of the server (e.g., video monitor output) may be delivered by the client to the end-user.

A remote console may enable a client to use other server hardware, such as a CD ROM drive, a floppy drive, or power switch. Such remote console capability may be referred to as "virtual presence," indicating that an end-user of a client with full control over a server is virtually sitting in front of the server. Because any input or output delivered to or from the client is also delivered to or from the server, an end-user of the client achieves virtual presence and effectively has complete control of the server from a remote location.

Management processors have been developed to provide server-client networks with remote console capability without burdening the main processor or processors. However, implementing remote console through a management processor may be excessively slow. While increasing the computing power of management processors may increase remote console performance, it also significantly raises production cost.

Thus, an inexpensive system that provides seamless, high-speed remote console capability is desirable.

SUMMARY

The problems noted above may be solved in large part by a method and system for switching between remove console sessions. One of the exemplary embodiments may be a method comprising logging into a remote computer by way of a management processor to initiate a remote console session and switching between a default remote console session and a non-default remote console session.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Figure 1:
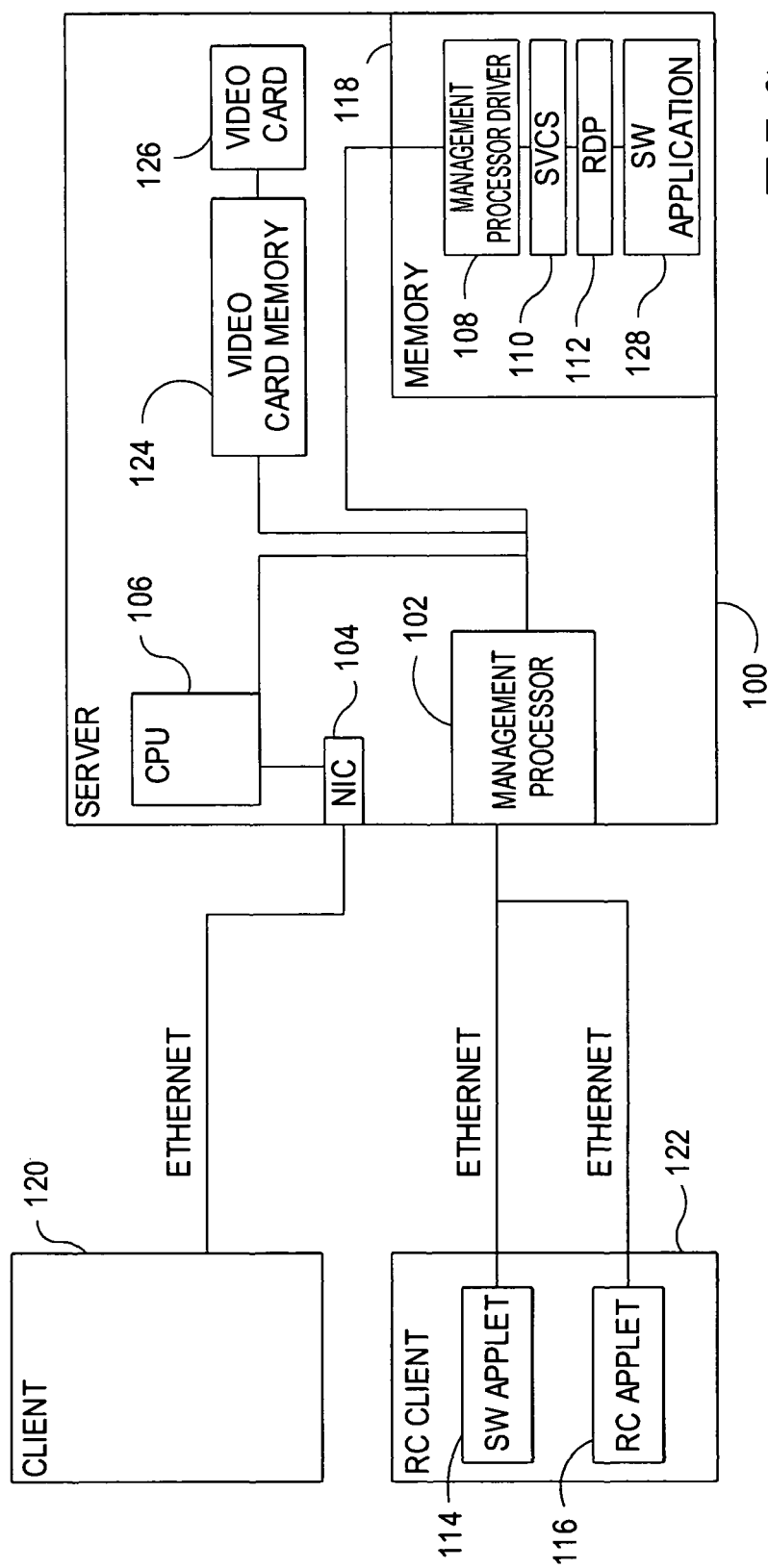
FIG. 1 illustrates a block diagram in accordance with embodiments of the invention.

FIG. 1 illustrates a block diagram of a server 100 coupled to a client 120 and a remote console client ("RC client") 122. The RC client 122 may comprise a terminal services applet ("TS applet") 114 and a remote console applet ("RC applet") 116, both of which will be explained below. In at least some embodiments, the clients 120, 122 couple to the server via Ethernet connections, but any communication network and protocol may be used. The server 100 may comprise a central processing unit ("CPU") 106 coupled to a memory 118, at least one network interface card ("NIC") 104 and a management processor 102. The NIC 104 enables one or more clients 120 to access and manipulate files on the server 100 as necessary. The management processor 102 enables the RC client 122 to remotely control and manipulate the server 100 and the contents of the server 100 by providing virtual presence. In at least some embodiments, the NIC 104 and the management processor 102 may operate on different physical networks, thereby increasing security and eliminating the possibility of clients 120 gaining unauthorized control of the server 100 through management processor 102. The server may also comprise memory 118 that stores software programs such as a management processor driver 108, a services ("SVCS") program 110, a remote desktop protocol ("RDP") 112 and a terminal services application ("TS application") 116. The memory 118 may be any available volatile or non-volatile memory, such as read only memory ("ROM") and random access memory ("RAM"), or the memory 118 may be a long term storage device, such as disk drive or CDROM device.

The management processor 102 couples the server 100 and the RC client 122, granting the end-user of the RC client 122 the virtual presence on the server 100. The management processor 102 may be active through server 100 states such as: a power-on self test mode, a pre-boot environment, before the operating system ("OS") has loaded, while the OS is functional, after an OS failure, or even if the server 100 has powered down. Through the management processor 102 an end-user may invoke a remote console to control the server 100.

In a remote console session, data output by the server 100 may be transmitted to the RC client 122. RC client 122 subsequently may output the data to an end-user. Similarly, data input by the end-user into the RC client 122 may be transmitted to the server 100. Data transfers between the RC client 122 and the server 100 may be accomplished through either a hardware-based remote console session or a software-based remote console session. Each of these types of sessions will be discussed in turn.

The hardware-based remote console may be performed by, among other things, the management processor 102 and the RC applet 116 running in RC client 122. More particularly, in a hardware-based remote console session the management processor 102 may snoop or intercept video data transferred to the video card 126 and corresponding video memory 124, and redirect the video data to the RC client 122. The management processor 102 may track changes in memory 124 of a video card 126 located in the server 100, analyze and compress data describing the changes, and send the data to the RC applet 116. The RC client 122 subsequently may display the data on a monitor coupled to the RC client 122.

Likewise for input data in the hardware-based remote console, the management processor 102 may accept input data (e.g., keyboard entries, mouse movement data) and channel the input data to the server such that the server may not be able to ascertain that the input originated at a remote location. Thus, a hardware-based remote console session may require the assistance of little, if any, software executed by the server CPU 106. Because a hardware-based remote console may not need the CPU 106 to be operational, data may be exchanged between the RC client 122 and the management processor 102 regardless of whether the server 100 is powered on, powered off, booting up, or in one of a variety of operating states. Since server 100 output data may be transmitted to the RC client 122 and displayed to the end-user, and because RC client 122 end-user input data may be transmitted to the management processor 102 and processed by the server 100, virtual presence may be achieved. That is, the end-user may interact with the RC client 122 as if the end-user was sitting directly in front of the server 100.

A software-based remote console session may require, among other things, the server 100 to be running an operating system ("OS") and possibly various other software programs. In a software-based remote console session, input/output data may be exchanged between the RC client 122 and software executed by the CPU 106 in the server 100. In software-based remote console sessions, the management processor 102 may act merely as a conduit through which data packets are routed to software executed by the CPU 106. Specifically, the TS application 116 executing in the server 100 may determine instructions (e.g., primitives or data packets) to send to the RC client 122 and route the instructions through the RDP 112, the SVCS 110 and the management processor driver 108 to the management processor 102. The management processor 102 may compress the instructions and transmit the instructions to the TS applet 115, where the instructions may be analyzed to form graphical or text-based output for the end-user of the RC client 122. Similarly, input data of the RC client 122 may be transmitted to the TS application 116 via the management processor 102, the management processor driver 108, the SVCS 110 and the RDP 112. Because all server 100 output may be transmitted to the RC client 122 and displayed to the end-user, and because all RC client 122 end-user input may be transmitted to the management processor 102 and processed by the server 100, virtual presence may be achieved. That is, the end-user may interact with the RC client 122 as if the end-user was sitting directly in front of the server 100.

The management processor driver 108, the SVCS 110, the RDP 112 and the terminal services application 116 of FIG. 1 may form a software stack. The management processor driver 108 may serve as a communication point between the management processor 102 and the SVCS 110. The management processor driver 108 may enable the software to communicate with the management processor 102. The SVCS 110 may be a communication point between the management processor driver 108 and the RDP 112. The SVCS 110 may connect the management processor 102 and TS application 116 through "localhost," a term describing a hostname of a computer that references that computer (e.g., IP address 127.0.0.1). The SVCS 110 also may be equipped to transfer data packets between the management processor 102 and the RDP 112. The RDP 112 may be coupled to the SVCS 110 via a network stack running on the server 100. The RDP 112 collaborates with the TS application 116 to transfer data between the RC client 122 and the server 100. Specifically, the RDP 112 may use a built-in video driver to render display output by constructing the rendering information into data packets using RDP protocol and sending the packets to the RC client 122. When input data are sent from the RC client 122 to the server 100, the RDP 112 may use a built-in virtual keyboard and mouse driver to receive the keyboard and mouse events.

Embodiments of the invention integrate hardware-based remote console capability with software-based remote console capability to improve remote console performance and maintain lower production cost. Because hardware-based remote console capability is hardware-based and may not need software or OS assistance, the hardware-based remote console capability may be used whenever the OS of the server 100 is not running (e.g., while the server 100 is powered down, during the boot-up process, or during OS failure).

Because software-based remote console sessions may involve communication with programs executable by the more powerful CPU 106 and compression of instructions to build video images, as opposed to compression of images as performed by the hardware-based remote console operation mode, the software-based remote console operation mode may be faster, more efficient and may provide graphics of increased quality. Thus, in at least some embodiments, the software-based remote console operation mode may be set as the default mode. However, the end-user of RC client 122 may be able to set either operation mode as the default operation mode. For example, the management processor 102 may continually attempt to launch the software-based remote console operation mode if the software-based remote console operation mode is the default operation mode and is not already in use.

Figure 2:
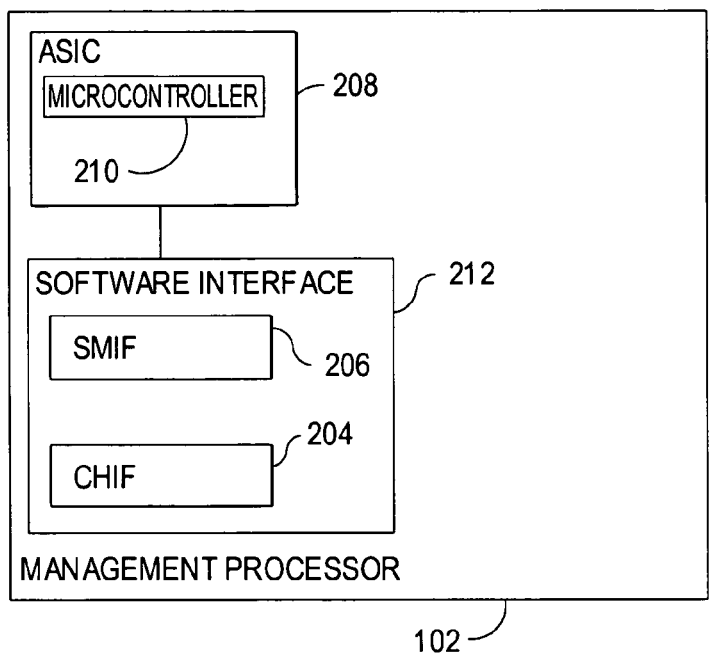
FIG. 2 illustrates a block diagram of a management processor in accordance with embodiments of the invention.

Referring to FIGS. 1 and 2, FIG. 2 illustrates the management processor in greater detail. Management processor 102 may comprise a shared memory interface ("SMIF") 206 and a channel interface ("CHIF") 204, both coupled to an application specific integrated circuit ("ASIC") 208. ASIC 208 may comprise a microcontroller 210. CHIF 204 may be an interface by which user level code on the OS may communicate directly with the management processor 102 without contending with other software attempting to do the same. SMIF 206 may be memory on the management processor 102 that may assist communication between a client and a host server. Communication between the management processor 102 and the software running on a server coupled to the management processor 102 may be accomplished by sending SMIF 206 data packets via the CHIF 204, as explained below.

Figure 3:
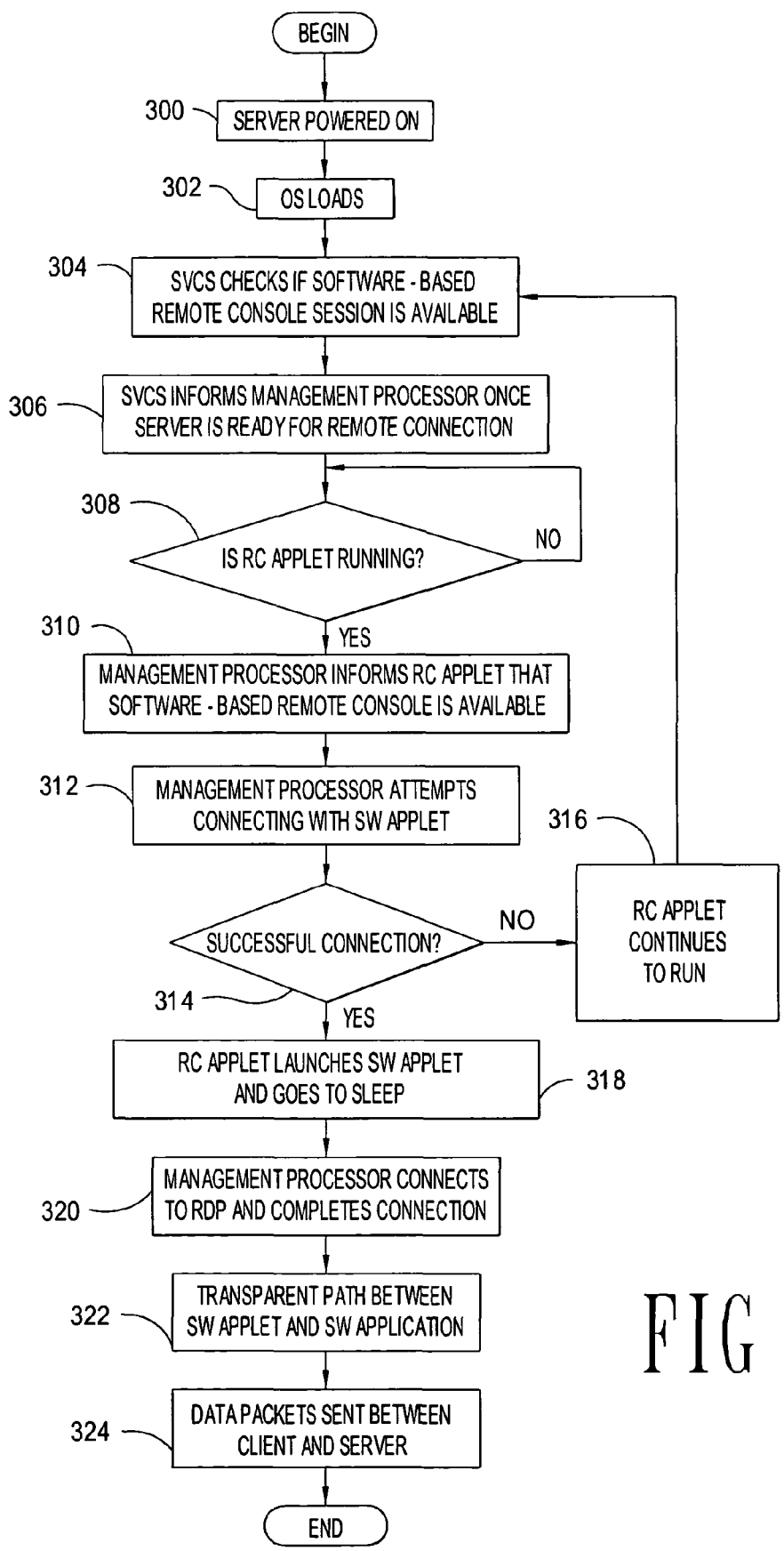
FIG. 3 illustrates a flow diagram that may be implemented in accordance with embodiments of the invention.

FIG. 3 illustrates a flow diagram associated with the client-server network of FIG. 1. The process may begin with the server 100 powering on and starting the boot-up sequence (block 300). The operating system (i.e., Microsoft® Windows®, Linux®) may then load (block 302). The SVCS 110 may attempt to connect to the TS application 116 through the RDP 112 (block 304). The SVCS 110 may inform the management processor 102 once the server 100 is ready for a remote console connection (block 306). The management processor 102 subsequently may respond to the SVCS 110 by informing SVCS 110 that the RC client 122 has been notified that the server 100 is ready to establish a remote console connection. Communications between the management processor 102 and software located on the server 100 may be achieved by transmitting and receiving SMIF 206 packets via the CHIF 204. In a switching mechanism described below, the management processor 102 may determine whether the RC applet 116 is already activated (block 308). If the RC applet 116 is already activated or engaged in a hardware-based remote console session with the server 100, the management processor 102 may inform the RC applet 116 that because the OS is presently running, software-based remote console may be available (block 310). For example, an RC client 122 and the server 100 may be engaged in a hardware-based remote console session prior to the server 100 being powered on. Once the server 100 is powered on and the OS is loaded, the management processor 102 may detect the hardware-based remote console session and may notify the RC applet 116 that a faster, more efficient software-based remote console session may be available. The management processor 102 then may attempt a software-based remote console connection with the RC client 116 (block 318) and determine whether the connection was successful (block 320). If the RC client 116 declines a software-based remote console connection or the connection is not successfully established, the RC applet 116 may continue to run and the management processor 102 may continue to attempt a software-based remote console connection with the RC client 116 (block 322). However, if the RC client 116 accepts a software-based remote console connection and the connection is successfully established, the RC applet 116 may launch the TS applet 114 and then enter a hibernation mode, wherein the RC applet 116 may still retain control of the TS applet 114 but may otherwise remain inactive (block 324). The management processor then may connect to the RDP 112, completing a connection between the TS applet 114 and the TS application 116 (block 326).

If the RC applet 116 was not engaged in a hardware-based remote console session with the server 100 prior to the server 100 being powered on, the SVCS 110 may command management processor 102 to connect with the TS applet 114 (block 312). If the connection attempt is unsuccessful (block 314), then no connection is established (block 316) and the management processor 102 may continually attempt to connect with the TS applet 114. Alternatively, the management processor 102 may attempt to establish a hardware-based remote console session by connecting with the RC applet 116. However, if the TS applet 114 connection attempt is successful, then the management processor 102 may connect to the TS application 116 through RDP 112 (block 326), completing the necessary connections for software-based remote console session to occur. That is, a transparent connection may be established from the TS applet 114 on the RC client 122 to the TS application 116 on the server 100 (block 328). Data packets subsequently may be transmitted back and forth between the RC client 122 and the server 100 (block 330). If the OS is deactivated, the server is powered down, the server 100 is no longer ready to be connected to an RC client 122, or any other event occurs that prevents the software-based remote console session from functioning properly, the management processor 102 may send a command to the RC applet 116 to deactivate the TS applet 114. The management processor 102 also may command the RC applet 116 to replace the software-based remote console session with a hardware-based remote console session, since the hardware-based remote console session does not require an OS or other software to function properly.

Figure 4:
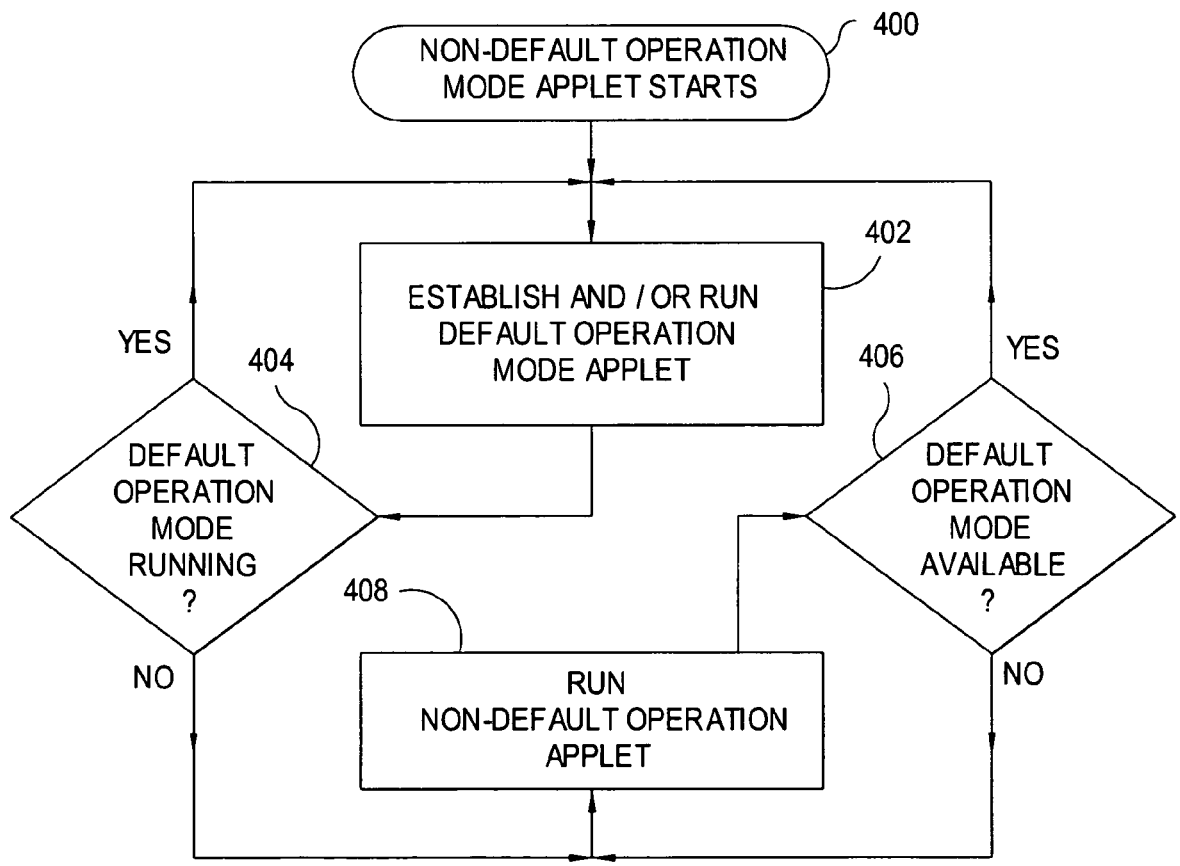
FIG. 4 illustrates a flow diagram of an operation mode switching mechanism that may be implemented in accordance with embodiments of the invention.

FIG. 4 illustrates the switching mechanism between software and hardware-based remote console sessions. The switching mechanism may be used to activate an operation mode or to switch from a default operation mode to a non-default operation mode. The switching mechanism may be active at any given time and may be activated or deactivated by an end-user of the RC client 122, the management processor 102 or any other appropriate entity. The process may begin with the applet of the non-default operation mode being in an active state (block 400). For example, if the software-based remote console operation mode is the default operation mode, then the process could begin with the RC applet 116 being active and a hardware-based remote console session in progress. The management processor 102 then may attempt to launch the applet for the default mode of operation and establish a complete connection from the RC client 122 to the server 100 (block 402). For instance, if the software-based remote console operation mode is the default operation mode, then the management processor 102 may attempt to launch TS applet 114. Once the management processor 102 is connected to the TS applet 114, the management processor 102 may attempt to connect with the TS application 116 to form a complete connection from the TS applet 114 to the TS application 116.

The management processor 102 may perform a check to determine whether the default operation mode is active (block 404). If the default operation mode is active, then the management processor 102 may continue to run the default operation mode and continually check to ensure that the default operation mode is still active (blocks 402, 404). However, if the default mode of operation is not active, the management processor 102 may activate the non-default mode of operation (block 408) while attempting to determine whether the default mode of operation is available (block 406). If the default mode of operation becomes available while running the non-default mode of operation, the management processor 102 may deactivate the non-default mode of operation and launch the default mode of operation (block 402). Until the default mode of operation becomes available, the management processor 102 may continue to run the non-default mode of operation (block 408). In at least some embodiments, the default mode of operation may be the software-based remote console capability and the non-default mode of operation may be the hardware-based remote console capability.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:

logging into a remote computer by way of a management processor that resides within the remote computer, the management processor different than a central processing unit of the remote computer, and the logging into the remote computer initiates a console session being a default remote console session; and then switching the console session between a default remote console session and a non-default remote console session.

2. The method of claim 1, wherein the default remote console session is a hardware-based remote console session and the non-default remote console session is a software-based remote console session.

3. The method of claim 1, wherein the default remote console session is a software-based remote console session and the non-default remote console session is a hardware-based remote console session.

4. The method of claim 1, wherein the default remote console session is adjustable between a hardware-based remote console session and a software-based remote console session.

5. The method of claim 1, wherein switching further comprises:

determining availability of the default remote console session;

disabling the non-default remote console session; and enabling the default remote console session.

6. The method of claim 1, wherein the logging step further comprises logging into the management processor comprising an application-specific integrated circuit, a microcontroller and a memory for communication between the remote computer and the management processor.

7. A server comprising:

a general processor; and a management processor coupled to the processor to manage remote console sessions to:

receive a request to initiate a remote console session; and switch between a default remote console session and a non-default remote console session.

8. The server of claim 7, wherein the default remote console session is a software-based remote console session and the non-default remote console session is a hardware-based remote console session.

9. The server of claim 7, wherein the default remote console session is a software-based remote console session and the non-default remote console session is a hardware-based remote console session.

10. The server of claim 7, wherein the default remote console session is adjustable between a hardware-based remote console session and a software-based remote console session.

11. The server of claim 7, wherein the management processor is configured to:

determine availability of the default remote console session;

disable the non-default remote console session; and enable the default remote console session.

12. The server of claim 7, wherein the management processor is configured to switch between the default remote console session and the non-default remote console session automatically upon determining that the default remote console session is more efficient than the non-default remote console session, wherein the default remote console session is software-based and the non-default remote console session is hardware-based.

13. A non-transitory, computer-readable storage medium (CRSM) containing software that when executed by a processor, causes the processor to:

initiate a remote console session by way of a management processor at a remote terminal;

wherein the remote console session is switched between a default remote console session and a non-default remote console session.

14. The CRSM of claim 13, wherein the default remote console session is a software-based remote console session and the non-default remote console session is a hardware-based remote console session.

15. The CRSM of claim 13, wherein the default remote console session is a software-based remote console session and the non-default remote console session is a hardware-based remote console session.

16. The CRSM of claim 13, wherein the default remote console session is adjustable between a hardware-based remote console session and a software-based remote console session.

17. The CRSM of claim 13, wherein the software further causes the processor to:

determine availability of the default remote console session;

disable the non-default remote console session; and enable the default remote console session.

18. The CRSM of claim 13, wherein the switching is automatically performed by the management processor when the management processor determines that the default remote console session is more efficient than the non-default remote console session, wherein the default remote console session is software-based and the non-default remote console session is hardware-based.

* * * * *